(12) United States Patent  
Samadani et al.

(10) Patent No.: US 8,466,952 B2  
(45) Date of Patent: Jun. 18, 2013

(54) ANALYSIS OF VIDEO COMPOSITION OF PARTICIPANTS IN A VIDEO CONFERENCE

(75) Inventors: Ramin Samadani, Palo Alto, CA (US); Daniel George Gelb, Redwood City, CA (US); Mary Baker, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 871 days.

(21) Appl. No.: 12/606,333

(22) Filed: Oct. 27, 2009

(65) Prior Publication Data

US 2011/0096140 A1    Apr. 28, 2011

(51) Int. Cl.  
*H04N 7/14*    (2006.01)

(52) U.S. Cl.  
USPC .................................... 348/14.16; 348/14.01

(58) Field of Classification Search  
USPC ............................. 348/14.01, 14.16; 382/103  
See application file for complete search history.

(56) References Cited

U.S. PATENT DOCUMENTS

| 7,986,336 | B2* | 7/2011 | Cok et al. | 348/14.01 |
| 2007/0122034 | A1* | 5/2007 | Maor | 382/181 |
| 2008/0240571 | A1* | 10/2008 | Tian et al. | 382/190 |
| 2009/0256901 | A1* | 10/2009 | Mauchly et al. | 348/14.07 |
| 2010/0149310 | A1* | 6/2010 | Zhang et al. | 348/14.16 |

* cited by examiner

*Primary Examiner* — Stella Woo (57) ABSTRACT

A method of determining whether a video frame meets the design composition requirements associated with a video conference, said method comprising steps performed by a processor of: providing design composition requirements for the video frame, wherein the design composition requirements are available at runtime; analyzing captured video content from a video conference, to determine whether a participant of interest is present in a video frame of the video content; and analyzing the video frame to determine if it meets the design composition requirements for the video conference.

20 Claims, 8 Drawing Sheets

ANALYSIS OF VIDEO COMPOSITION OF PARTICIPANTS IN A VIDEO CONFERENCE

CROSS REFERENCE TO RELATED APPLICATION

The present application shares some common subject matter with co-pending and commonly assigned U.S. patent application Ser. No. 12/606,318, filed on Oct. 27, 2009, and entitled "Audiovisual Feedback to Users of Video Conferencing Applications," the disclosure of which are hereby incorporated by reference in their entirety.

BACKGROUND

Users of remote video conferencing applications may not be aware of whether they are properly framed within the video frame as viewed by other participants in the video conference. To prevent poor framing, some video conferencing systems, such as the Halo Video Conferencing system developed by Hewlett-Packard Company, have dedicated conference rooms which include tables and chairs specifically designed to properly position meeting participants. This careful design ensures that the video conference participants are well aligned with the conferencing system's cameras and microphones, increasing the likelihood that video conference participants are well framed within the video.

Unfortunately video conferencing applications that allow users to join meetings in an ad hoc fashion using cameras and microphones attached to a PC or laptop, cannot rely on this careful design. To provide information to the local user as to how they are viewed by remote participants in the video conference, some remote conferencing applications cotinuously display video of the local user along with video of all the other video conference participants on the user's screen. While a local user can receive information about how they are framed by actively viewing the continuous display, this can be distracting. People can be easily distracted by seeing video of themselves during a video conference, making it difficult for the participant to concentrate on the meeting itself.

Some systems use face detection to try and improve video quality. But face detection algorithms will not detect many framing errors that result in poor video composition because, for example, they fail if the face is not fully in the frame. Some systems combine motorized pan/tilt cameras with face detection techniques in an attempt to keep a video conference participant in frame automatically, thus providing good video composition. These systems require additional hardware components which add cost and size limitations to the system. In addition, a moving camera view can be distracting to remote viewers, especially if the camera motion is jerky or unnatural.

A method of detecting and measuring whether the composition in a video frame is esthetically pleasing without unduly distractions or adding significant costs to the video conferencing system is needed.

BRIEF DESCRIPTION OF THE DRAWINGS

The figures depict implementations/embodiments of the invention and not the invention itself. Some embodiments of the invention are described, by way of example, with respect to the following Figures.

DETAILED DESCRIPTION OF THE PREFERRED EMBODIMENTS

The present invention provides a method of providing an esthetically pleasing video frame composition for participants in a videoconference. According to the present invention, a video frame composition is considered to be good (esthetically pleasing) if the participant is in the frame and the video frame meets the required design composition requirements. The described system implements the method by: analyzing captured video content from a video conference, to determine whether a participant of interest is in a video frame of the video content; and analyzing the video frame to determine if it meets the design composition requirements for the video conference.

The described system and method has the advantages of: allowing for automatically generated signals that may provide the user feedback about a bad video frame composition, detecting poor video framing or bad pose within the video frame (composition requirements that are difficult to detect using traditional face detection techniques), having low computational requirements. Further, the method is easily adaptable to provide different weights to design composition rule elements.

In one embodiment, system designers generate design composition rules based on inputs or tests with users and participants. These design composition rules are generated before run time so that they can be provided to the video conference session. In one embodiment, the framing requirements may be easily modified to reflect the design composition requirements that are considered important by the video conference system designers. By providing a video frame composition that meets the design composition requirements of the video conference participants, a better quality video conference experience is provided. These design composition requirements are easily applied to ad hoc video conferences where providing high quality video frame compositions is often difficult to achieve.

Figure 1A:
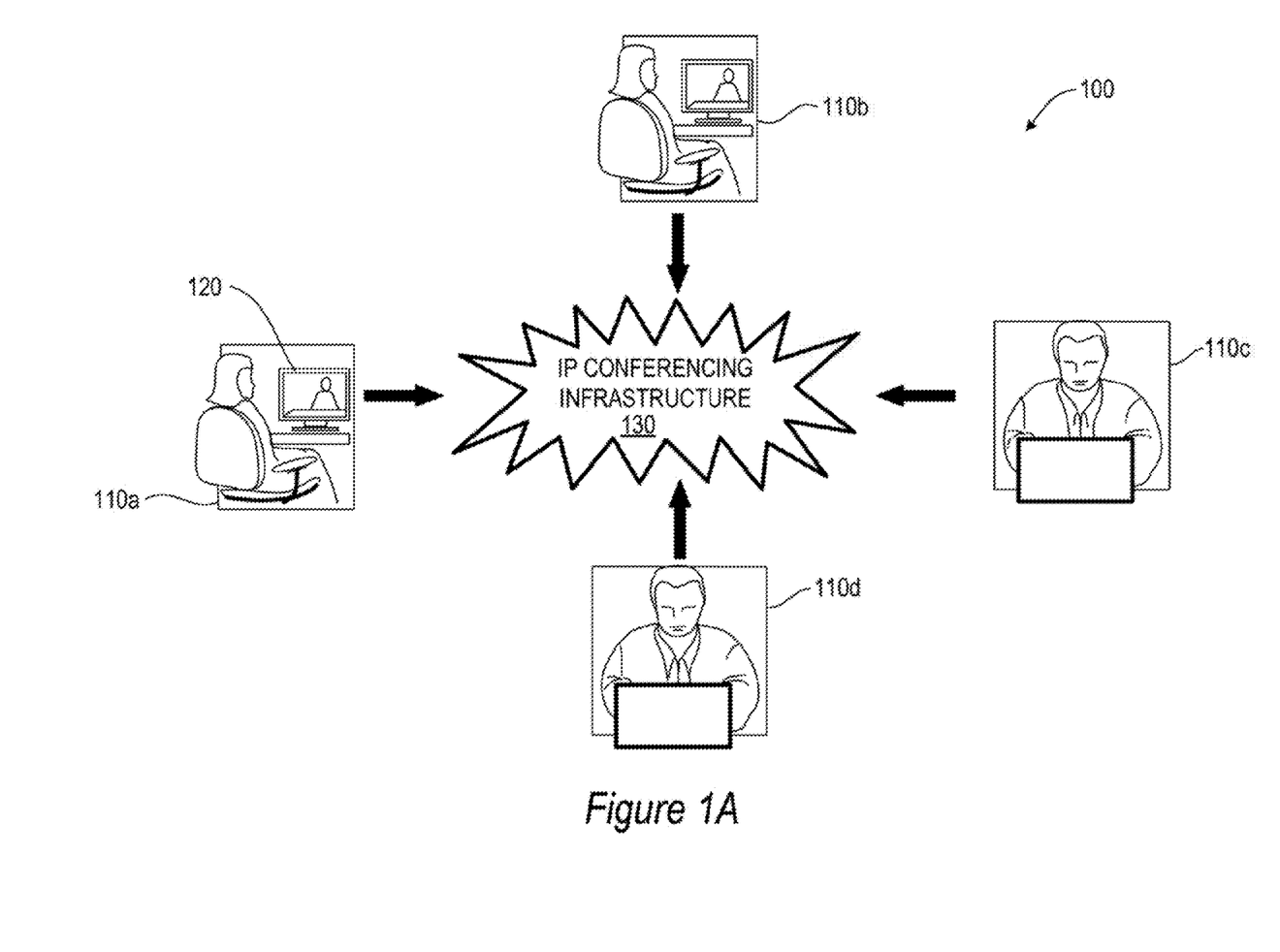
FIG. 1A shows a video conferencing configuration according to one embodiment of the present invention.

Referring to FIG. 1A shows a video conferencing configuration 100 that can be used to implement the method of determining whether a participant in a video frame meets the composition requirements associated with a video conference according to one embodiment of the invention. For purposes of example, the video conferencing system 100 shown consists of four participants communicatively coupled to and interfacing with the IP Conferencing Infrastructure 130 through their computer systems (either laptops 110*c*, 110*d* or desktops 110*a*, 110*b*). Each computer system is associated with a video capture device and an audio capture device that captures the audio and video associated with the present invention. In one embodiment a camera capable of capturing audio and video associated with a participant is mounted onto the display screen of the computer. In an alternative embodiment, the audio and video capture devices are integrated into the computer system (not shown).

In the present invention, the participants see a video of the other remote participants. In one embodiment (where each participant is associated with a single audio capture and video capture device), each participant sees a different view or display. Because it is common for different participants to have different views, to distinguish the participant's view whose perspective we are taking from other participants in the conference, we refer to this view as view of the local participant. The other participants, whom are being viewed by the local participant, are referred to as the remote participants or the remote users. Thus for example, if we are viewing the video conference from the eyes of or the perspective of participant 110*c* in the video conference, we refer to participant 110*c* as the local user or local participant. The participants 110*a*, 110*b*, and 110*d* would be referred to as the remote users or remote participants.

Figure 1B:
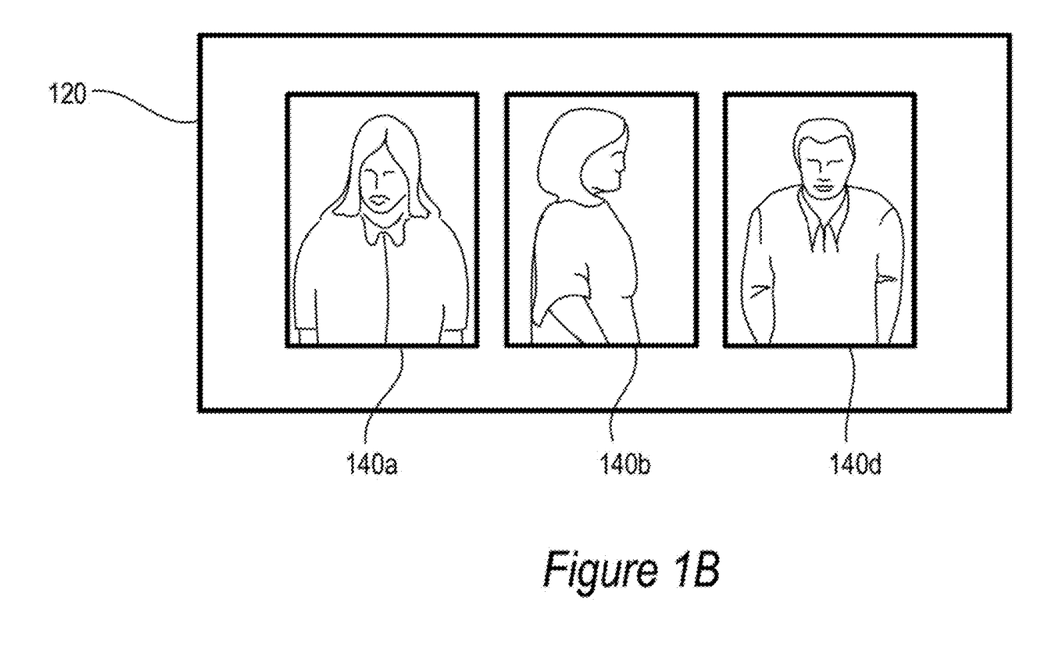
FIG. 1B shows a typical display in the video conferencing configuration shown in FIG. 1A according to one embodiment of the present invention.

Referring to FIG. 1B shows the display 120 that the local user would see of the other video conference participants according to one embodiment of the present invention. The display 120 in FIG. 1B, is the display of the computer screen of the local user 110*c*. In other words, the screen 120 that is shown in FIG. 1B is what the local user 110*c* would see while viewing the video conference. The display seen in FIG. 1B is the display that would be seen under normal operating conditions. By normal operating conditions we mean that the video conferencing system is operational and that the local user is meeting the presentation requirements of the video conferencing session.

The presentation requirements of the video conference are designed to provide an immersive experience to the user so that the participants can pay attention to the content being presented at video conference itself without undue distraction. The presentation requirements for a video conferencing session often include, but are not limited by the following considerations: framing (defines the alignment of the participant in the video frame), pose (the orientation of the participant relative to the camera, for example, having the participant facing the camera so that both eyes are visible), proper distance (participant's distance from the camera), audio volume (whether the volume of the participants is adequate and can be clearly heard), a high signal to noise ratio, etc. The design composition requirements are a subset of the presentation requirements that are related to the participant's placement (participant is in the right place (distance from and alignment with the camera), looking in the right direction (pose)) within the video frame. For the presentation requirements listed above for example, the framing, pose, and proper positioning presentation requirements are also design composition requirements.

Referring again to FIG. 1B, unlike some video conferencing configurations where a real time video stream of the local user is displayed on the local user's screen. The present invention does not continuously display a realistic view of the local user as it is seen as being too distracting. Instead, the present invention displays realistic views of the remote users 110*a*, 110*b*, and 100*d* only. Referring to FIG. 1B, view 140*a* corresponds to remote user 110*a*, view 140*b* corresponds to remote user 110*b*, and view 140*d* corresponds to the video stream of remote user 110*d*.

Figure 3:
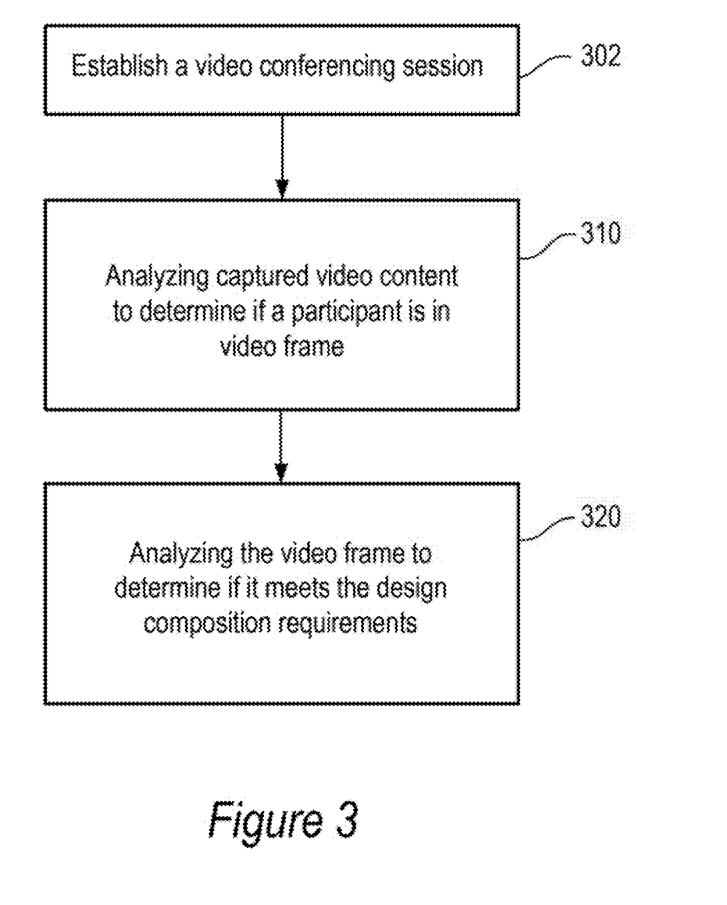
FIG. 3 shows a flowchart of the method of determining whether a participant in a video conference is correctly framed according to one embodiment of the present invention.

FIG. 3 shows a flowchart of the method of determining whether a video frame meets the design composition of the video conference according to one embodiment of the present invention. One of the steps in determining whether a video frame is well composed and thus meets the design composition requirements for the video conference, is the step of analyzing the video content to determine whether the participant is present within the video frame (step 310). Once the video is captured, we can analyze the video frame in numerous ways to review different presence indicators. For example, one indicator of the physical presence of a participant in a video is the detection of motion. Others include, but are not limited to, the detection of a an object within the frame (the participant) using a depth sensor, the detection of a human participant by detecting flesh tones, the detection of a participant using face detection, etc. Any of numerous methods that detect whether a physical object is present within a defined space may be used.

In one embodiment of the present invention, video frames are analyzed for motion detection to determine if a video conference participant is within the video frame. Although different motion detection algorithms can be used to determine if motion between video frames has occurred, in one embodiment a simple difference between video frame pixels is calculated. According to this method, pixel locations in the video frame at time t1 are compared to the same pixel locations in a sequential video frame at a different time t2. If there is a sufficient difference between a number of the the pixel values, it is assumed that motion has occurred and that a participant is present in the video frame.

In one embodiment of the present invention, video frames are analyzed for an object (the participant) at a certain depth range to the camera, in order to determine if a video conference participant is within the video frame. If a video camera that has a depth sensor is used in capturing the video frame, the output video frame will include data that can provide information about what physical objects are located within the video frame and at what depth each object is located. We make the assumption that the object located within a certain depth range of the video camera is the participant. Further, we make the additional assumption that if no object is located within this range—no participant is present in the video conference.

In one embodiment of the present invention, the detection of skin or flesh tones within the video frame is used to determine the presence of a participant in the video conference. It is assumed that if skin tones are found in front of the video camera, a participant (a human being with skin) is sitting in front of the video camera. Similarly, in one embodiment, a face detection algorithm is used to determine whether a participant is present within the video frame. If a face is detected using the algorithm, it is assumed that the participant (a human being with a face) is present in the video frame.

The different presence indicators (motion, depth sensor, skin tone detection, face detection, etc.) can be used in combination with each other to provide additional verification that the participant is present. Say for example, a coat rack is physically located in front of the computer screen at the right depth from the video camera. A system that relies on a depth sensor might determine that the coat rack is a participant. However, if the depth sensor presence indicator is combined with a skin tone indicator, then we will get a more reliable determination as to whether a participant is present. For the coat rack example, while the depth sensor might indicate that a participant is present, the skin tone detector would not find any flesh tones within the video frame and would thus determine that no participant was present.

Referring to FIG. 3, after it has been determined that a participant is present within the video frame, we need to determine whether the participants in the video frame meet the design composition requirements for the video conference session (step 320). As previously stated, the design composition rules are a subset of the presentation requirements of the video conference. The design composition requirements of the video frame relates to how the participant is placed (distance, alignment, pose) with respect to the video capture device and how the participant appears within the video frame. Video frame design composition requirements include, but are not limited to: framing (defines the alignment of the participant in the video frame), pose (the orientation of the participant relative to the camera, for example, having the participant facing the camera so that both eyes are visible), proper distance (participant's distance from the camera).

One of the main video composition design criteria relates to whether the participant of the video conference is properly positioned within the video frame. In order to determine whether the participant is properly framed, the proper or correct position within the video frame needs to be defined. In one embodiment, the correct positioning within the video frame is defined by a mask.

Figure 2A:
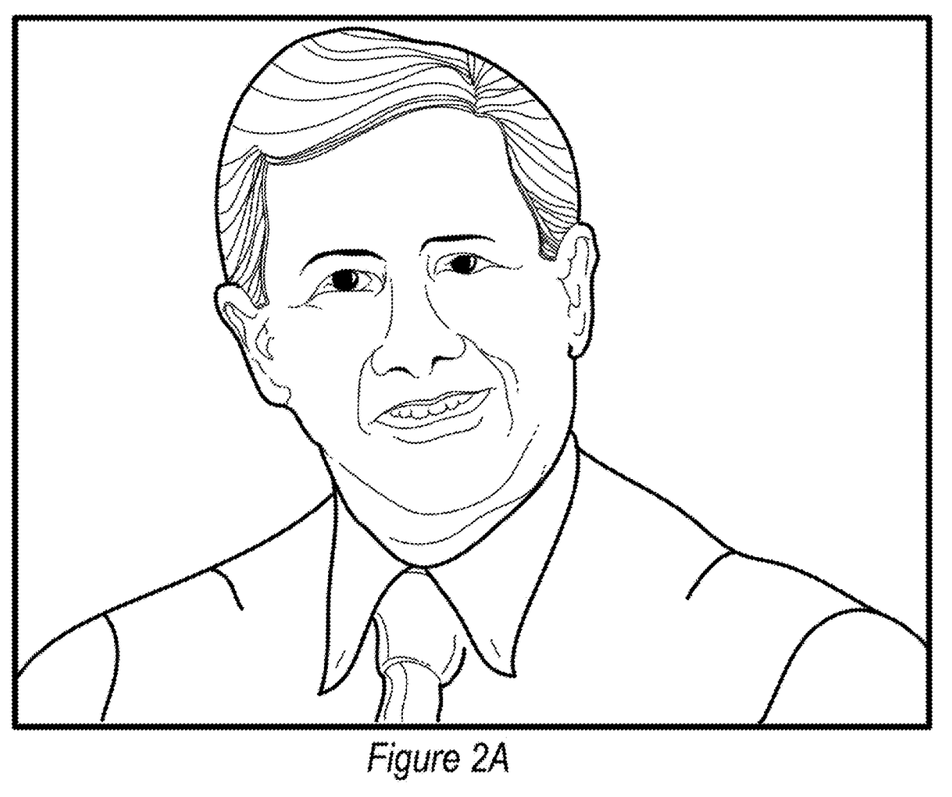
FIG. 2A shows a representative drawing of a video frame image according to one embodiment of the present invention.

FIG. 2A shows a representative drawing of a video frame image such as would be output on the display of the video conferencing system shown in FIG. 1A. The representative drawing shown in FIG. 2A corresponds to a single view (say view 140d) and not of the entire display (which shows three views 140a, 140b and 140d). The participant in the view that we are currently analyzing is referred to as the participant of interest.

Before we can determine whether the participant of interest is correctly framed, we need to define the regions in the video frame that we want the participant of interest to be physically located within. When the participant of interest is within these defined physical boundaries, we say that the participant is correctly or properly framed. Although these regions or boundaries can be defined in various ways, in the embodiments described in this invention, we define this desirable area of confinement area by defining a video frame mask. The video frame mask maps out regions or areas where it is desirable for the video conference to remain in order to provide the best immersive experience (by providing a better video frame composition) for the remote participants who are viewing the participant of interest.

Figure 2B:
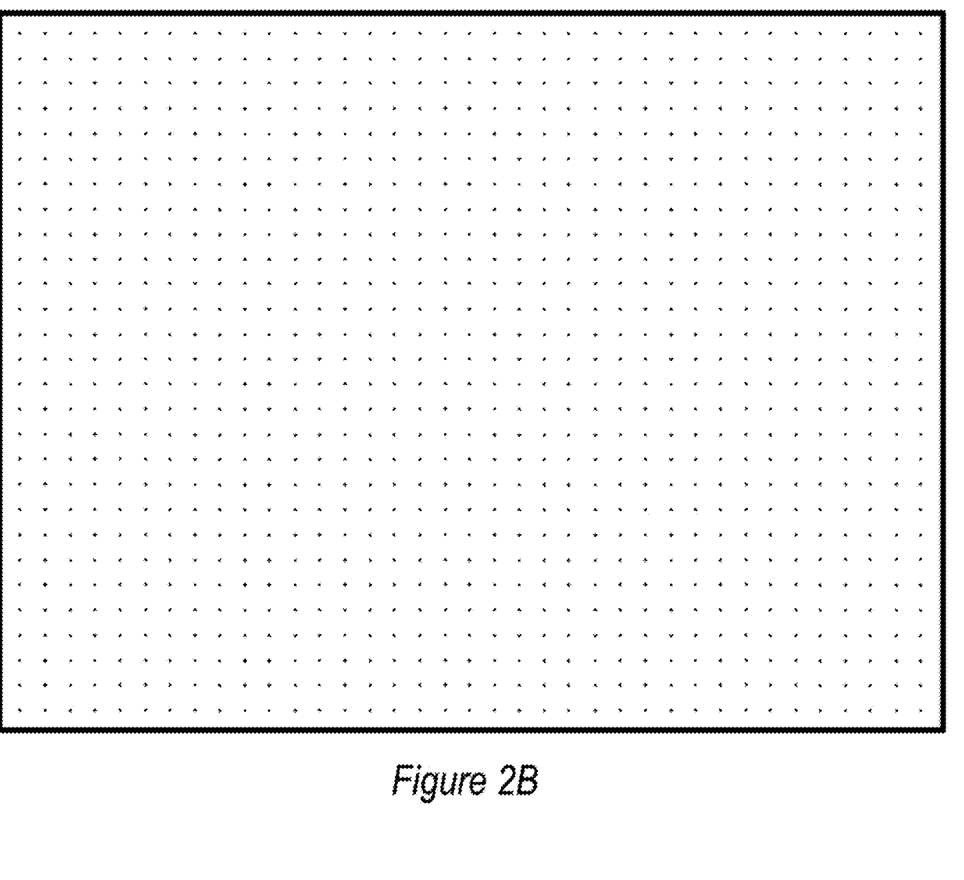
FIG. 2B shows a sub-sampled grid pattern used in the design of a video frame mask according to one embodiment of the present invention.

Although we could choose to process every pixel in the video frame, in the embodiment described in the present invention, we've chosen to process a subset of pixels in order to decrease the processing burden on the system. FIG. 2B shows a sub-sampled grid pattern that is used in the design of a video frame mask according to one embodiment of the present invention. The representative dots shown in FIG. 2B shows a grid pattern that covers the entire video frame. The grid pattern is represented by the matrix w(i,j) where i and j are the pixel spatial indices of the matrix. The dots are representative of the subset of pixels that have been selected for processing. Typically, the dots do not show up on the display screen. The dots are merely for purposes of illustration.

Figure 2C:
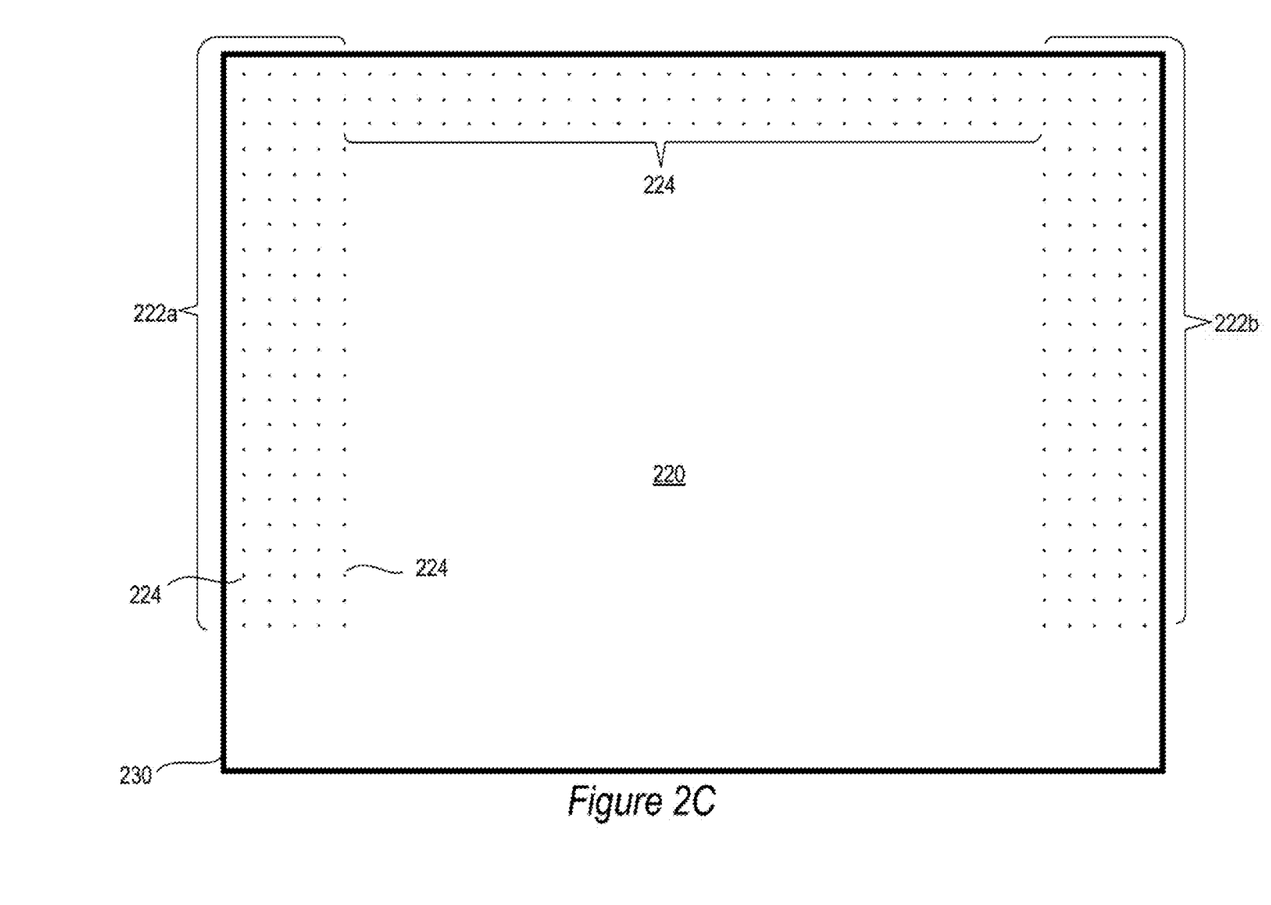
FIG. 2C shows a video frame mask according to one embodiment of the present invention.
Figure 2D:
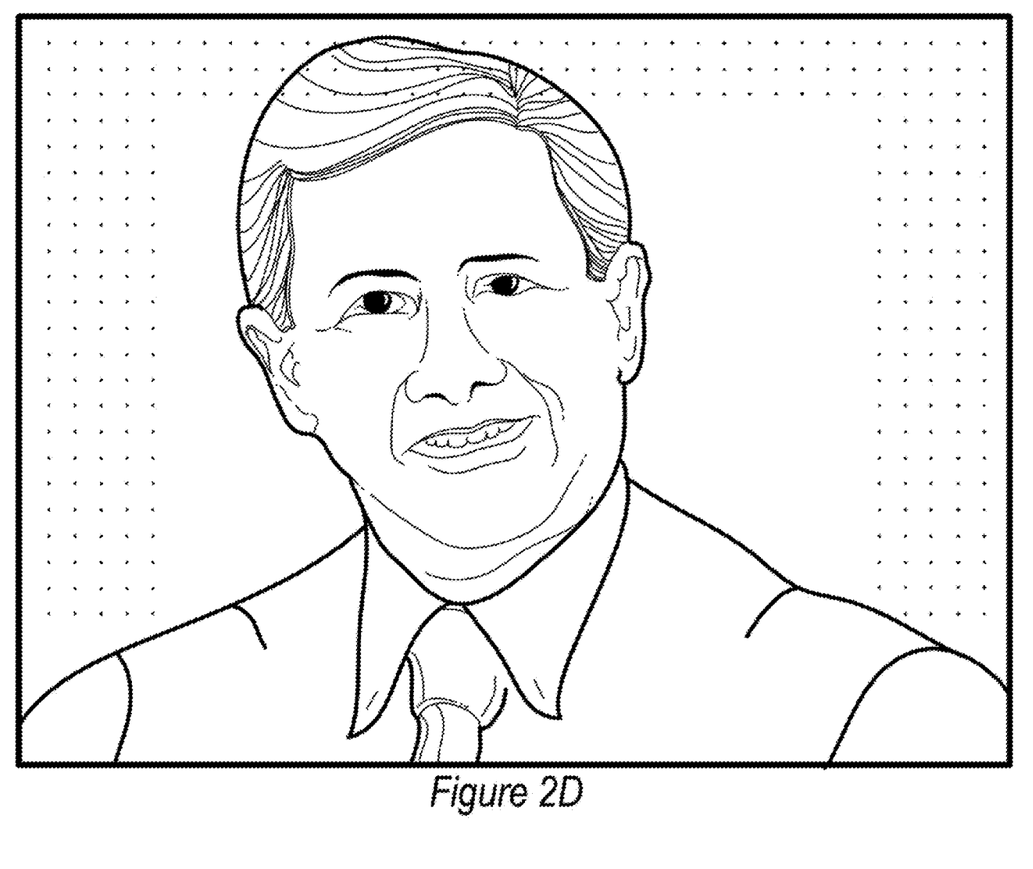
FIG. 2D shows the video frame mask shown in FIG. 2C superimposed on the representative drawing of the video frame shown in FIG. 2A.

In the present invention, FIG. 2C shows a video frame mask according to one embodiment of the present invention. FIG. 2D shows the video frame mask shown in FIG. 2C superimposed on the representative drawing of the video frame shown in FIG. 2A. The mask defines the regions, and boundaries of the regions, that define whether or not the participant of interest is correctly framed or not. Although the presentation requirements specified by the system or the user can define various framing criteria, the embodiment we will primarily discuss for illustrative purposes and as shown in FIGS. 2C and 2D, discuss the embodiment where the participant is framed in the center of the video frame mask.

The mask defines the region that we want the participant of interest to be physically located within. The area of physical confinement that we wish the participant to remain within is often referred to as the sweet spot. Referring to FIG. 2D and FIG. 2C, region 220 (the area inside the dotted line boundaries of the grid pattern) is defined as the sweet spot. In one embodiment, we define (and present) the dotted areas of the mask that can be seen in the FIGS. 2D and 2C, as the areas that it is undesirable for the participant to move within if the participant wishes to be properly framed.

For example, to stay centered it is desirable to include mask side regions 222a, 222b shown in FIG. 2C. The width of the side regions of the mask can be used to designate more specific positions of the participant within the video frame. In other words, changing the width of the side regions of the mask changes the area within which the participant is free to move around and stilt stay within the sweet spot. For example, wider side regions would inhibit the participant's movement while narrower side regions would provide more flexibility of movement.

Referring to FIGS. 2C and 2D, one can notice that there are dots in the grid pattern at the top of the video frame, but not at the bottom of the video frame. There is no bottom dotted line region of the mask, since it would not be undesirable (and is in fact it is expected) that the body of the participant would move in the lower region of the video screen. There is also a grid pattern, the top mask 224, at the top of the video frame. In the embodiment shown, the participant's head intersects with the dotted grid pattern so that the top of the participants head is seen as being in an undesirable area of the video frame.

When the participant is positioned or partially positioned within an undesirable region of the mask, send feedback to the participant to change his position. Also, since the participant's head can still clearly be seen within the video frame, we could also redesign the dotted upper region to only extend to the outermost boundary of the video frame.

This way feedback would only be generated if the participants head moved out of the video frame. In one embodiment, we could also weight the top video frame mask area of the head much lower than when participant enters the side regions, so that impact of the participant's head being in the mask region is minimized.

The mask regions define the areas of confinement for the participant and although the masking regions are shown as rectangular regions they can be any shape. For example, the mask regions could be an oval shaped geometric pattern that centers on the participants or an irregular geometric shape that centers on the face of the participant. Also, although in the embodiment shown the participant is basically centered in video frame, the video conference system designer can make other video frame composition choices. For example, using the described mask, the system designer could require that participant be in the right most half of the video frame. In this case, the right most mask region would be either very thin or alternatively would just consist of the boundary 230. In addition, the left most region mask 222a would be expanded and would essentially take up the left half of the video frame.

In one embodiment of the present invention, the mask is weighted. The weights determine how important it is not to overlap the particular mask region. You can think of weights as penalties. If presence is detected, how much penalty is incurred depends on the weight at that location. A higher weight would cause a higher penalty and a lower weight a lower penalty. For the case we are describing, if the participant is positioned exactly at the right place within the frame (here in the center) then there is no penalty. But there may be a penalty for being positioned more to one side of the video frame.

In one embodiment, the penalties for not being properly positioned within the video frame are summed by first multiplying by the weights in the mask. Say the participant crosses into an undesirable area the mask region which causes them to not be ideally centered. Say in this case, the participants body only overlaps one pixel. For each dot in the grid that the participant overlaps, the value of the weight (one in this case) is added to the total penalty value. in one implementation of the present invention, once you pass a predetermined threshold value for the penalty, you are deemed not to have met the composition design requirements. If you do not meet the composition design requirements (or you are past the predetermined threshold by a certain amount), feedback (an alarm notification) may be sent to the participant. Typically, feedback is sent to the local participant.

In one embodiment, instead of having weighted values for different locations within the mask, the video frame mask is a binary mask. For a binary mask, the weights values are either one or zero. The weights represented by the areas in the dotted region of the mask (222a, 224, 222b) shown in FIG. 2C have a value of one, while the values of the pixels in the sweet spot region 220 have a value of zero.

For a binary implementation, all of the video frame mask values in the dotted regions have the same value—a value of one. In other words, the pixels in the grid near the inside edge of the mask have the same value as the pixels in the grid in the outermost edge of the mask—they all have a value of one. In contrast, when the mask is weighted, some of the weight values in the mask have a higher value than value than other pixels in a different location. For example the pixel in the grid near the inside edge 234 of the mask might have a value of 0.1 while the pixel in the grid near the outermost edge 238 of the mask might have a value of 0.9.

In one embodiment, the weighting of the mask is adjusted based upon desired sensitivity of the mask. For an example, where we are trying to have the participant stay centered within the video frame, we might as previously stated give a pixel near the inside edge 234 of the mask a low value of 0.1, while the pixel in the grid near the outermost edge 238 of the mask might have a value of 0.9. Thus, if a participant is only slightly off center, then the participant's entry into this region of the mask (near the inside edge 234) would result in a low total pixel value that would not make the video frame meet exceed it's threshold value for meeting the design composition requirements. If the participant is more off center and more of their head and body is in the outermost region of the mask (near the outermost edge 238), then the participants entry into this region would result in a high total pixel value, most likely causing the participant to exceed the threshold value. In this case, the participant would not meet the design composition requirements.

In addition, different regions of the mask might be weighted to be sensitive to different criteria. For example, if we know that the participant has full head of hair, then we might weight the upper region video frame mask to be sensitive to flesh tones. In this way, the mask would not be sensitive to the top of the participant's head until the forehead area of the participant's face entered into the upper region of the video frame mask. Also, the mask might be sensitive to more than one (a combination of) weighting factors. For example, in one embodiment we could have a mask sensitive to motion detection but weighted by skin tones if activity of skin tones is deemed most important and we don't care if participant's clothes are out-of-frame.

Once we design the mask, we need to determine whether the participant is framed within the mask according to the design composition requirements. In one embodiment, we determine whether the design composition requirements are met by adding up the pixel mask values inside the boundaries of the mask regions (220). In another embodiment, we determine whether the design composition requirements are met by adding up the pixel mask values within the mask regions (222a, 222b). In another embodiment, we determine whether the design composition requirements are met by looking at the pixel mask values both inside the boundaries of the mask region (220) and within of the mask regions (222a, 222b).

Whether we are adding up the values inside of the boundaries of the mask region or within the mask region, the pixel mask values are combined to give a total pixel mask value. In one embodiment, if the total pixel mask value is below the threshold value (defined by the design composition requirements as providing a well framed composition), the video frame is displayed. If the total pixel mask value is over a certain threshold (defined by the design composition requirement) than an output is generated that can be used to provide the user feedback about the bad design composition (that the presentation requirements have not been met.) Dependent upon the design of the video conferencing system, the video frame that is determined to be poorly framed may be displayed or not displayed. For example, it may be displayed in order to be used as feedback to the local participant that they are poorly framed.

As previously stated, in one embodiment the total pixel value is computed in the regions that are inside of the boundaries (220) of the mask regions. Some pixels on the inside of the mask regions may be weighted. For these pixels, the weighted value of the pixel is added to calculate the total pixel mask value. In one embodiment, the total pixel mask value is used to determine if the participant is inside of the frame (inside the boundaries of the mask region 220).

Similarly, in one embodiment the total pixel mask value is computed for pixels within the mask regions (222a, 222b, 224) themselves. Some pixels within the mask regions may be weighted and for these pixels, the weighted value of the pixel is added to calculate the total pixel value. Dependent on how high the total pixel value is, it can be used to determine if the participant is primarily inside of the mask region or partially within the mask region (partially within frame). The participant may also be totally out of frame. In this case, there is no pixel value within the mask itself or inside of the boundaries of the mask. This method of course could be used as a method of to determine whether a participant present in the video frame. If there is no pixel value within the mask itself or inside the boundaries of the mask for a given time period, it is likely that no participant is present.

As previously stated, once we determine that a participant is present within the video frame, we need to determine whether the participants in frame meet the design composition requirements for the video frame. One of the design composition requirements is the distance of the participant from the camera. The distance of the participant from the camera will determine how close or far away the participant appears is in the video frame. For example, a participant who is rolled back in their chair leaning backwards may appear too small in the video frame and not meet the design composition requirements.

Although a face detection algorithm could be used (perhaps modified to detect a smaller or larger face than is normal), in one embodiment a depth camera can be used to determine whether the participant is within a distance from the camera that is defined as providing a good video frame composition. If the participant is measured as not being within the threshold distances (defined by the design composition requirement) than an output is generated that can be used to provide the user feedback about the bad video composition (that the presentation requirements have not been met.) Dependent upon the design of the video conferencing system, the video frame that is determined to be an improper distance from the video camera may be displayed or not displayed. For example, it may be displayed in order to be used as feedback to the local participant that they are an improper distance from the video camera.

Especially for ad hoc video conferencing set ups, there are two things that commonly interfere with good video composition. First, it is common for the participant to be partially out of frame. Second, it is common for participant to be poorly posed. For example, the participant might be centered within the frame but looking sideways away from the video camera. In one embodiment, a design composition requirement is the requirement for the video conference participant to be looking directly at the camera.

Although the system may be implemented with only one design composition requirement for the video frame, it may also be implemented to comply with one than one design composition requirement. For example, even if a video participant is correctly framed, this does not tell you if the participant is turned sideways or not. Thus, it is may be desirable to combine the design composition requirement of the participant being correctly framed with the design composition requirement of looking directly at the camera.

For the purpose of compliance with the design composition rule for pose, we can use a combination of activity and a specially trained face detector. For activity, we measure to see that there is activity inside the mask. For the face detector, we train it to detect frontal faces and faces with in plane rotation, but not faces with out of plane rotation. Then for good pose detection, if there is activity within the mask, but the face detector stops detecting the face, we know that the pose does not meet the design composition requirements and is not good. This approach is advantageous since it does not solve the complex 3D pose estimation problem, but instead it uses well-known face detection techniques. In fact, the face detection should be fast since we do not need to detect out of plane rotated faces.

If it is determined that the video frame does not meet the defined by the design composition requirement, then an output is generated that can be used to provide the user feedback about the bad design composition (that the presentation requirements have not been met. This output can be used, for example as described in the related case "Audiovisual Feedback to Users of Video Conferencing Application", having Ser. No. 12/606,318 filed Oct. 27, 2009, which is incorporated herein by reference in it's entirety. The aforementioned case describes a system and method of providing feedback to a participant in a video conference regarding whether they meet the presentation requirements of the video conference including whether they are properly framed. In one embodiment, the output from the method described in this application (whether correctly framed or not) is one of the outputs received. If the system receives information that the video frame is not properly framed, it automatically sends feedback to at least the local video conference participant.

Some or all of the operations set forth in the methods shown in FIG. 3 and described in the present application may be contained as a utility, program, or subprogram, in any desired computer accessible medium. In addition, the methods may be embodied by computer programs, which can exist in a variety of forms both active and inactive. For example, they may exist as software program(s) comprised of program instructions in source code, object code, executable code or other formats. Any of the above may be embodied on a computer readable medium, which include storage devices.

Exemplary computer readable storage devices include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 4:
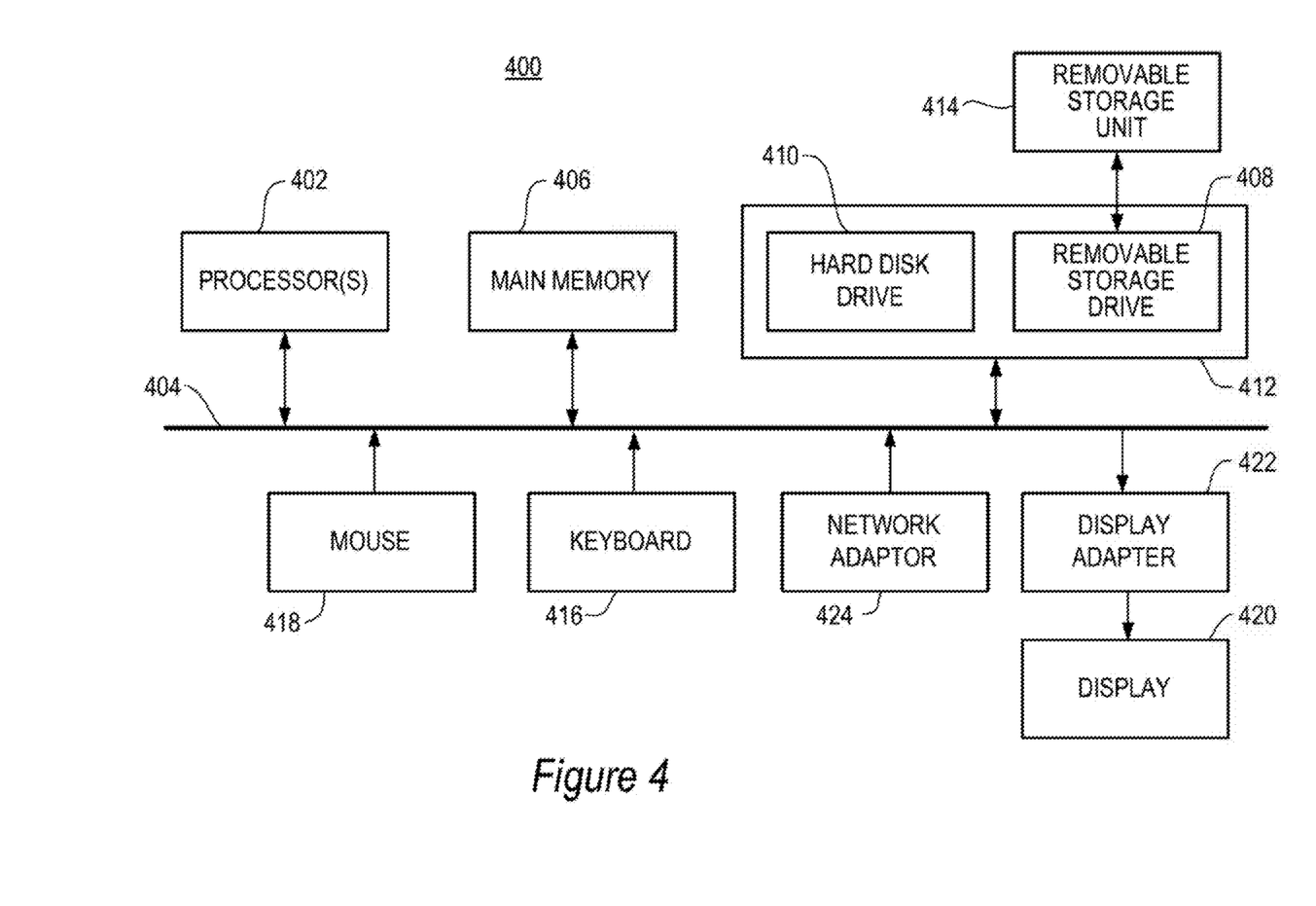
FIG. 4 illustrates a block diagram of a computing system configured to implement or execute the method shown in FIG. 3 according to one embodiment of the present invention.

FIG. 4 illustrates a block diagram of a computing system 400 configured to implement or execute the method shown in FIG. 3 and described herein. The computing apparatus 400 includes a processor 402 that may implement or execute some or all of the steps described. Commands and data from the processor 402 are communicated over a communication bus 404. The computing apparatus 400 also includes a main memory 406, such as a random access memory (RAM), where the program code for the processor 402, may be executed during runtime, and a secondary memory 408. The secondary memory 408 includes, for example, one or more hard disk drives 410 and/or a removable storage drive 412, representing a floppy diskette drive, a magnetic tape drive, a compact disk drive, etc., where a copy of the program code for the methods described in the present invention may be stored.

The removable storage drive 410 reads from and/or writes to a removable storage unit 414 in a well-known manner. User input and output devices may include a keyboard 416, a mouse 418, and a display 420. A display adaptor 422 may interface with the communication bus 404 and the display 420 and may receive display data from the processor 402 and convert the display data into display commands for the display 420. In addition, the processor(s) 402 may communicate over a network, for instance, the Internet, LAN, etc., through a network adaptor 424.

It will be apparent to one of ordinary skill in the art that other known electronic components may be added or substituted in the computing apparatus 400. It should also be apparent that one or more of the components depicted in FIG. 4 may be optional (for instance, user input devices, secondary memory, etc.).

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. For example, in an earlier described embodiment one embodiment the design composition requirements are met, if the total pixel mask values do not exceed a threshold value. However in an alternative embodiment, for example, we could look at the sweet spot of the mask and only say that it meets the design composition requirements if it meets or exceeds the threshold value. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method of determining whether a video frame meets design composition requirements associated with a video conference, said method performed by a processor comprising:
   providing design composition requirements for the video frame, wherein the design composition requirements are available at runtime;
   defining a mask, wherein the mask is used to determine whether the design composition requirements are met;
   analyzing captured video content from a video conference to determine whether a participant of interest is present in a video frame of the video content; and
   analyzing the video frame to determine if the video frame meets the design composition requirements for the video conference, including:
      determining a mask value based on a relation between the mask and the participant of interest in the video; and
      comparing the determined mask value to a threshold value, wherein the design composition requirements are met if the determined mask value is below the threshold value.

2. The method recited in claim 1 wherein the design composition requirements include at least: framing, pose, and proper distance.

3. The method recited in claim 1, wherein the mask is used to determine if framing design composition rules are met.

4. The method recited in claim 1, wherein the mask is a grid pattern associated with sub-sampling of pixels in the video frame.

5. The method recited in claim 4, wherein values associated with the pixels in the mask are added to determine a total pixel mask value.

6. The method recited in claim 4, wherein the mask is weighted.

7. The method recited in claim 6, wherein the sub-sampling of pixels not meeting the design composition requirements are multiplied by the weights in the mask.

8. The method recited in claim 6 wherein the design composition requirements are met if the framing design composition rules meet or exceed a threshold value.

9. The method recited in claim 1 wherein responsive to the video frame meeting the design composition requirements, the video frame is displayed.

10. The method recited in claim 1 wherein determining whether a participant of interest is present in the video frame is based on a determination of whether motion has occurred between at least a first video frame and a second video frame.

11. The method recited in claim 1 wherein determining whether a participant of interest is present in the video frame is determined by detection of skin tones in the video frame.

12. The method recited in claim 1 wherein determining whether a participant of interest is present in the video frame is determined by face detection in the video frame.

13. The method recited in claim 1 wherein determining whether a participant of interest is present in the video frame is determined by detection of depth in the video frame.

14. The method recited in claim 1, wherein presence of a participant in a frame is determined by a combination of presence indicators including motion detection, detection of skin tones, detection of depth and face detection.

15. The method of claim 1 wherein the video frame is analyzed to see if a pose of the participant of interest meets the design composition requirements using a face detector.

16. The method of claim 1 wherein the video frame is analyzed to see if the participant of interest is the proper distance from a video capture device using a depth sensor.

17. The method of claim 1, wherein determining the mask value includes:
   determining an amount of overlap between the participant of interest in the video frame and the mask; and
   determining the mask value based on the determined amount of overlap between the participant of interest in the video frame and the mask.

18. A non-transitory computer readable storage medium having computer-readable program instructions stored thereon for causing a computer system to;
   provide design composition requirements for a video frame, wherein the design composition requirements are available at runtime;
   define a mask, wherein the mask is used to determine whether the design composition requirements are met;
   analyze captured video content from a video conference to determine whether a participant of interest is present in a video frame of the video content; and
   analyze the video frame to determine if the video frame meets the design composition requirements for the video conference, including:
      determine a mask value based on a relation between the mask and the participant of interest in the video; and
      compare the determined mask value to a threshold value, wherein the design composition requirements are met if the determined mask value is below the threshold value.

19. The non-transitory computer readable storage medium of claim 18, wherein the computer-readable program instructions to determine the mask value includes computer-readable program instructions to:
   determine an amount of overlap between the participant of interest in the video frame and the mask; and
   determine the mask value based on the determined amount of overlap between the participant of interest in the video frame and the mask.

20. An apparatus for providing feedback to a participant in a video conference, the apparatus comprising:
   a computer readable storage medium with computer executable instructions stored on the computer readable storage medium, wherein the computer executable instructions are to:
   provide design composition requirements for a video frame, wherein the design composition requirements are available at runtime;
   define a mask, wherein the mask is used to determine whether the design composition requirements are met;
   analyze captured video content from a video conference to determine whether a participant of interest is present in a video frame of the video content; and
   analyze the video frame to determine if the video frame meets the design composition requirements for the video conference, including:
      determine a mask value based on a relation between the mask and the participant of interest in the video; and
      compare the determined mask value to a threshold value, wherein the design composition requirements are met if the determined mask value is below the threshold value.

* * * * *

UNITED STATES PATENT AND TRADEMARK OFFICE
CERTIFICATE OF CORRECTION

PATENT NO. : 8,466,952 B2
APPLICATION NO. : 12/606333
DATED : June 18, 2013
INVENTOR(S) : Ramin Samadani et al.

It is certified that error appears in the above-identified patent and that said Letters Patent is hereby corrected as shown below:

In the Claims:

In column 11, line 34, in Claim 4, delete "claim 1,wherein" and insert -- claim 1, wherein --, therefor.

In column 12, line 16, in Claim 18, delete "to;" and insert -- to: --, therefor.

Signed and Sealed this
Nineteenth Day of November, 2013

Teresa Stanek Rea
*Deputy Director of the United States Patent and Trademark Office*